J. C. WHITEHILL.
Water Cooler.

No. 62,582.

Patented March 5, 1867.

Witnesses:
Frank Hunkle
Charles H. Burton

Inventor:
James C. Whitehill

United States Patent Office.

JAMES C. WHITEHILL, OF ST. LOUIS, MISSOURI.

Letters Patent No. 62,582, dated March 5, 1867.

---

IMPROVED FILTER AND COOLER.

---

*The Schedule referred to in these Letters Patent and making part of the same.*

---

TO ALL WHOM IT MAY CONCERN:

Be it known that I, JAMES C. WHITEHILL, of St. Louis, in the county of St. Louis, and State of Missouri, have invented a new and useful Improvement in Water Filters, with Purifier and Cooler combined; and I do hereby declare that the following is a full, clear, and exact description of the construction and operation of the same, reference being had to the annexed drawing, making a part of the specification.

I construct my filters of any known or required form and of any suitable material.

Figure 1:
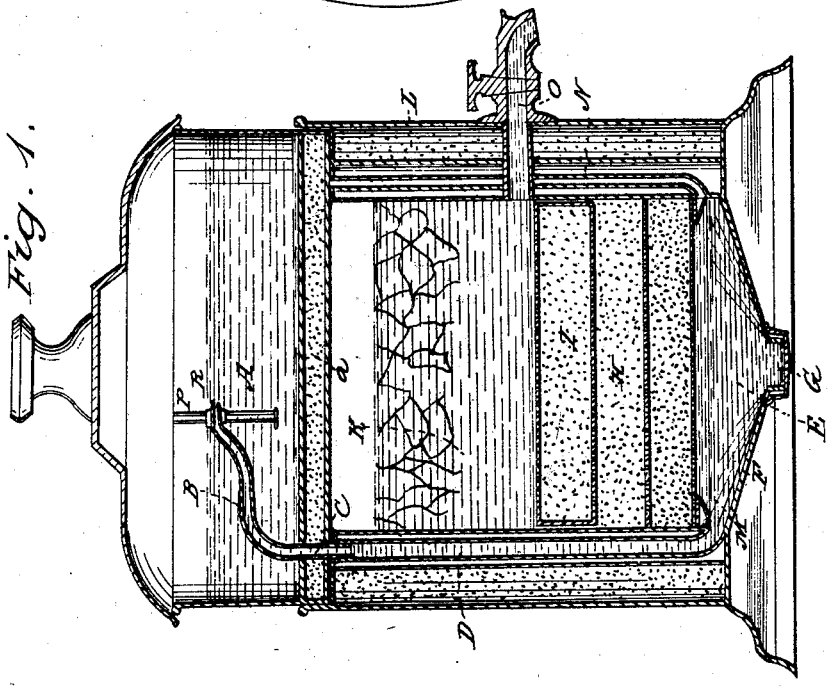

Figure 1 is a longitudinal elevation of a filter made of zinc or galvanized iron.

Figure 2:
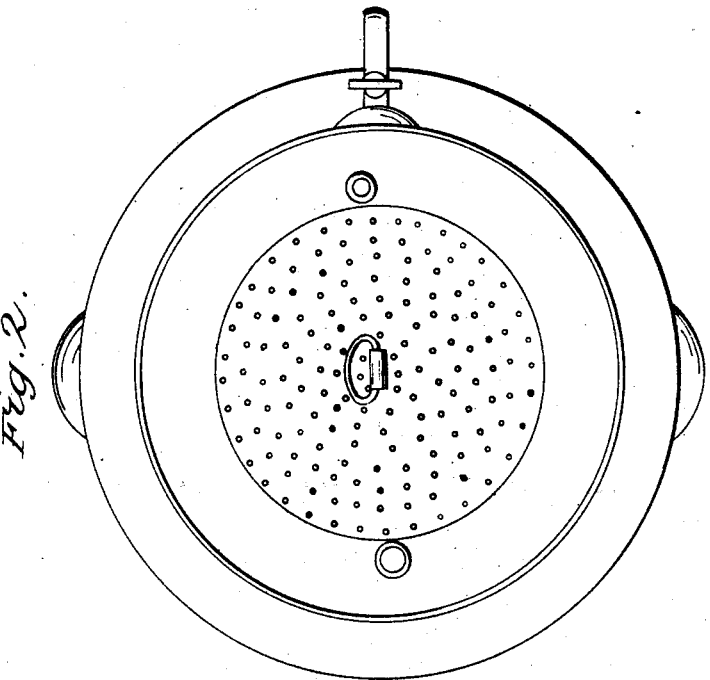

Figure 2, a transverse section of the same.

A is a reservoir for unfiltered water, with a non-conducting bottom, $a$, and so constructed that it can be removed at pleasure. B is an elastic tube having a water-tight joint or coupling, C, between the bottom of the reservoir A and the tube D, and through which the water is conducted to the chamber E, beneath the filter bed. This joint or coupling may consist, as in the figured drawing, of a metallic tube, projecting sufficiently far into the reservoir A to form an attachment for the elastic tube B, and beneath the bottom $a$, in such manner as to slide within or otherwise connect with the upper part of the tube D, or of any similar or suitable device. The orifice or free extremity of the elastic tube is made to float just beneath the surface of the water, and has an adjustable arrangement for arresting its descent at such distance from the bottom of the reservoir as may be desired. This arrangement consists of a bar or rod, P, upon which the floating orifice R of the tube slides by means of a loop, or other suitable attachment, and is arrested in its descent at such point as may be desired by an adjustable slide on the rod or bar, or by other suitable means. This arrangement is particularly advantageous in filtering water containing a large amount of mud or sediment, as the Missouri river water, in which at some seasons of the year the contained mud and sediment are nearly equal to one-fourth the volume of the water, as by conveying the water beneath the filter bed, from the surface of that in the reservoir A, the greatest possible benefit is obtained from the process of "settling," a large proportion of the mud and sediment gravitating to the bottom of the reservoir, or below the point to which the orifice of the tube is permitted to descend, from whence it can be readily removed, and to a corresponding extent prevent the filter bed from becoming foul and clogged. E is a reservoir for unfiltered water beneath the filter bed, with a bottom, F, inclining from all parts of the circumferences to the centre, where there is an eduction port, G, for discharging the mud or sediment deposited in this chamber. H is a series of strata of sand, gravel, porous stone, baked earth or clay, or other suitable porous material, through which the water rises to a strata of compressed sand, gravel, and charcoal, or other suitable material, I, through which it rises into the clear water and ice chamber K. The filter bed is constructed separate from the filter, so that it can be removed at pleasure and any part renewed or cleansed when required, and also that free access may be had to all parts of the filter. If the lower sections or strata of the filter bed are sand, gravel, or any such material, perforated disks or plates are required for them to rest upon, and similar plates or disks may be required for compressing the component parts of the upper strata I. K is the clear water and ice chamber, surrounded by the non-conducting cylinder L. M is a ledge or projection for the filter bed to rest upon. The filter bed is made water-tight around its circumference by necessary packing of rubber, leather, or other suitable material. N is an air tube communicating with the reservoir E. O is the faucet from which the filtered water is drawn. The ice is placed in the chamber K by removing the reservoir A.

What I claim as my invention, and desire to secure by Letters Patent, is—

1. The arrangement of the removable reservoir A, having a non-conducting bottom $a$, the clear water and ice chamber K, the adjustable tube B, the joint or coupling C, and tube D, the whole constructed and operating substantially as shown and described.

2. The arrangement of the chamber K, surrounded by non-conducting material, the removable filter bed H I, the chamber E, the tube D, the coupling C, the adjustable tube B, and removable reservoir A $a$, the whole constructed and operating substantially as shown and described.

JAS. C. WHITEHILL.

Attest:
FRANK HINKLE,
CHARLES H. BRITTON.